(12) United States Patent
Haffmans

(10) Patent No.: US 11,910,820 B2
(45) Date of Patent: Feb. 27, 2024

(54) METHOD FOR OPERATING A CENTRIFUGAL DEVICE

(71) Applicant: Sormac B.V., Venlo (NL)

(72) Inventor: Hubertus Ernest Ferdinand Marie Haffmans, Venlo (NL)

(73) Assignee: Sormac B.V. (NL)

(*) Notice: Subject to any disclaimer, the term of this patent is extended or adjusted under 35 U.S.C. 154(b) by 883 days.

(21) Appl. No.: 16/965,468

(22) PCT Filed: Jan. 22, 2019

(86) PCT No.: PCT/NL2019/050033
§ 371 (c)(1),
(2) Date: Jul. 28, 2020

(87) PCT Pub. No.: WO2019/151852
PCT Pub. Date: Aug. 8, 2019

(65) Prior Publication Data
US 2020/0352209 A1    Nov. 12, 2020

(30) Foreign Application Priority Data
Feb. 1, 2018  (NL) .................................. 2020365

(51) Int. Cl.
*F16F 15/023*  (2006.01)
*A23N 12/08*   (2006.01)
*B04B 9/10*    (2006.01)
*B04B 9/12*    (2006.01)
*F16F 15/00*   (2006.01)
(Continued)

(52) U.S. Cl.
CPC .............. *A23N 12/086* (2013.01); *B04B 9/10* (2013.01); *B04B 9/12* (2013.01); *F16F 15/002* (2013.01); *F16F 15/005* (2013.01); *F16F 15/022* (2013.01); *F16F 15/023* (2013.01); *F16F 15/04* (2013.01)

(58) Field of Classification Search
CPC . A23N 12/086; B04B 9/10; B04B 9/12; F16F 15/002; F16F 15/005; F16F 15/022; F16F 15/023; F16F 15/04
USPC ..................................... 34/312–322
See application file for complete search history.

(56) References Cited

U.S. PATENT DOCUMENTS

| | | | |
|---|---|---|---|
| 2012/0151686 A1 | 6/2012 | Jang et al. | |
| 2018/0209085 A1* | 7/2018 | Xu | D06F 37/20 |
| 2018/0355539 A1* | 12/2018 | Wu | D06F 37/269 |

FOREIGN PATENT DOCUMENTS

| | | | |
|---|---|---|---|
| CN | 202026772 | * | 3/2011 |
| DE | 102007026882 A1 | | 12/2008 |
| KR | 20160079442 | * | 12/2014 |

(Continued)

OTHER PUBLICATIONS

International Search Report dated Jun. 24, 2019 issued in corresponding PCT Appln. No. PCT/NL2019/050033.

*Primary Examiner* — John P McCormack
(74) *Attorney, Agent, or Firm* — Carter, DeLuca & Farrell LLP

(57) ABSTRACT

The invention relates to a method for operating a centrifugal device. The invention furthermore relates to a centrifugal device. The centrifugal device is provided with a drum which can be driven at a variable speed of rotation, with a frame and with vibration dampers arranged between the frame and the drum. The invention furthermore relates to a computer program product.

14 Claims, 2 Drawing Sheets

(51) Int. Cl.
   *F16F 15/02* (2006.01)
   *F16F 15/04* (2006.01)

(56) References Cited

FOREIGN PATENT DOCUMENTS

NL       1013390 C2   9/2000
WO   2006072907 A1   7/2006

* cited by examiner

METHOD FOR OPERATING A CENTRIFUGAL DEVICE

CROSS-REFERENCE TO RELATED APPLICATION

This application is a National Stage Application under 35 U.S.C. § 371(a) of PCT/NL2019/050033, filed Jan. 22, 2019, which claims the benefit of and priority to Netherlands Patent Application No. 2020365 filed Feb. 1, 2018. The entire contents of all of the foregoing applications are incorporated by reference herein.

SUMMARY

The invention relates to a method for operating a centrifugal device provided with a drum which can be driven at a variable speed of rotation, with a frame and with vibration dampers arranged between the frame and the drum.

The invention furthermore relates to a centrifugal device.

There are many different kinds of centrifuges. Vegetables, but also other agricultural and industrial products, are often mechanically dewatered by means of a centrifugal device.

Centrifugal processes are also used for many other separation processes of solid and liquid substances, and even for separating two liquid substances having different physical properties.

Each centrifugal device has a certain speed range in which the deflection of the drum resulting from vibrations and oscillations, whether or not caused by an imbalance in a drum of a centrifugal device, is at its maximum. This phenomenon is referred to as resonance. This phenomenon may be amplified if the drum of the centrifugal device is loaded in a relatively disadvantageous way with a product to be centrifuged. In that case, it is even possible for the vibrations and oscillations to become so severe in the specific speed range that the centrifugal process has to be interrupted in order to prevent damage to the centrifugal device or the surroundings. Interruption results in a product which is insufficiently centrifuged. The product which has been insufficiently centrifuged can either be removed or be centrifuged again. In short, such interruptions are undesirable, inter alia from a business point of view.

The object of the invention is to improve the centrifugal process by minimizing or even virtually excluding the risk of interruption of the centrifugal process due to excessive vibrations and oscillations.

This object is achieved by means of the method according to Claim 1.

The method for operating a centrifugal device which is provided with a drum which can be driven at a variable speed of rotation, with a frame which is for example positioned on a floor and with vibration dampers arranged between the frame and the drum, preferably the vibration dampers are arranged between the frame and an intermediate frame for supporting/carrying the rotatable drum, wherein the method comprises the following steps:
A—increasing the speed of rotation of the drum,
B—modifying the damping properties of the vibration dampers during the increase in the speed of rotation of the drum (step A) in such a way that for each vibration damper the mechanical force which is required for compressing the vibration damper is reduced.

During acceleration, that is to say, increasing the rotary speed, the centrifugal device needs some time to pass the speed range where resonance occurs. Normally, the centrifugal device is constructed in such a manner that the speed range where resonance occurs is a relatively low speed range compared to the speed ranges in which the product is centrifuged, that is to say dewatered or the substances are separated from one another. The longer the centrifugal device stays within the resonance speed range, the greater the deflections of the drum will become. Empirically and arithmetically, it has been found that the resonance range can be influenced during operation, that is to say by modifying the damping properties of the vibration dampers. With the method, the mechanical force required to compress the vibration damper is decreased for each vibration damper when the speed of rotation of the drum is increased. Due to this decrease during the increase in speed of the drum, the resonance speed range can be moved to a lower rotary speed than where it would originally have been without modification of the damping properties of the vibration dampers for the centrifugal device in question. In this way, the time during which the drum remains in the speed range where resonance occurs can be kept to a minimum or can be essentially excluded, as a result of which the drum will not have an opportunity to reach an unacceptable deflection, as a result of which the centrifugal process would have to be interrupted.

The above-described method may be carried out automatically. It is possible to select an operating parameter of the centrifugal device which causes step B to be started when a predetermined value of the operating parameter is reached during step A. The sudden decrease in the mechanical force which is required for compressing the vibration dampers may take place on the basis of the rotary speed, for example if the resonance rotary speed range has been determined beforehand or is known for the centrifugal device, or on the basis of a predetermined threshold vibration speed of the drum being reached.

When determining which operating parameter(s) for initiation of step B is most suitable, the circumstances for the centrifugal process to be carried out, for example weight, amount of liquid in the product to be centrifuged, distribution of the product in the centrifugal device to be determined, may be used.

In order to determine the value of the operating parameter for initiating step B, an internal or external processor may be used, for example. This is advantageous, for example, if the centrifugal processes to be performed using the centrifugal device differ from each other, as a result of which the resonance range in the various centrifugal processes to be performed may differ. By means of the processor, a controller assigned to the centrifugal device may modify the damping properties of the vibration dampers. By means of the processor and the controller, the damping properties of the vibration dampers may be controlled actively in order to shorten the transit time through the resonance speed range or through different resonance speed ranges.

It is also possible for the centrifugal device to be configured in such a manner that the operating parameter and the value thereof required to initiate step B are fixed in a controller for a specific centrifugal device. This is possible if the centrifugal processes to be performed using the centrifugal device do not differ or only differ very slightly from one another, that is to say the resonance range does not differ or only differs very slightly for the centrifugal processes to be performed using the centrifugal device.

At least one of the following operating parameters may be used in the method:
  exceedance of a vibration deflection of the drum to be predetermined;
  a rotary speed to be predetermined;

elapsing of a predetermined time period after the start of the above-described step A.

The vibration deflection may be measured using sensors suitable for the purpose, wherein a predetermined deflection causes initiation of the above-described step B of the method.

The rotary speed may be measured by means of a revolution counter, wherein step B of the method is initiated when a predetermined rotary speed value is reached.

When using a predetermined time period as the operating parameter, the resonance speed range of the centrifugal device is known and the rotary speed profile in successive centrifugal processes to be performed is known or even substantially identical. On the basis of these data, the operating parameter time can be selected and the time value for initiating step B of the method can be selected.

After step B, the method may, in a further aspect, be provided with the following step:
C—modifying the damping properties of the vibration dampers, in such a way that, for each vibration damper, the mechanical force which is required to compress the vibration damper is increased.

This step is advantageous if increasing the mechanical force required for compressing the vibration dampers positively affects the centrifugal process, for example if the increase contributes to a reduction in the vibrations or the reduction of noises which may occur at certain (relatively high) speed ranges in the centrifugal process.

In particular, this step C may be used if the speed of rotation of the drum is decreased/slowed down, because in that case the above-described process for reducing the transit time of the resonance speed range may be used advantageously in a converse manner. That is to say that when the speed of rotation after a completed centrifugal process is reduced, the centrifugal device will at a certain point in time reach the resonance range again. By increasing the mechanical force which is required to compress the vibration damper just before traversing the resonance range during the decrease in the speed of rotation of the drum, the resonance speed range can be moved to a higher rotary speed than where it would originally have been if the damping properties of the vibration dampers had not been modified for the respective centrifugal device. In this way, the time spent in the speed range where resonance occurs can be kept to a minimum or can even be virtually eliminated, during the deceleration stage as well.

At least one of the vibration dampers may comprise a pressurized fluid, wherein the pressure in the vibration damper is lowered in step B and/or at least one of the vibration dampers may be a spring, preferably a magnetic spring. With a spring, it is possible, for example, to modify the spring constant in order to modify the damping properties according to the method described herein.

It is a further object of the invention to provide a centrifugal device in which the above-described method can be performed. In addition, the invention relates to a computer program product, comprising a readable storage medium provided with instructions which, if executed on at least one processor, ensure that the at least one processor carries out or can carry out the method as described above. The advantages of the method have been described above and will not be repeated here for the centrifugal device or the computer program product.

BRIEF DESCRIPTION OF THE DRAWINGS

The above-described aspects will be explained below by means of an exemplary embodiment in combination with the figures. However, the invention is not limited to the exemplary embodiments described below. Rather, a number of variants and modifications are possible which also use the inventive idea and are thus deemed to be covered by the scope of protection. In particular, the possibility to combine the properties/aspects which have only been mentioned in the description and/or been illustrated in the figures with the properties of the claims, insofar as compatible, is mentioned.

DETAILED DESCRIPTION

Figure 1A:
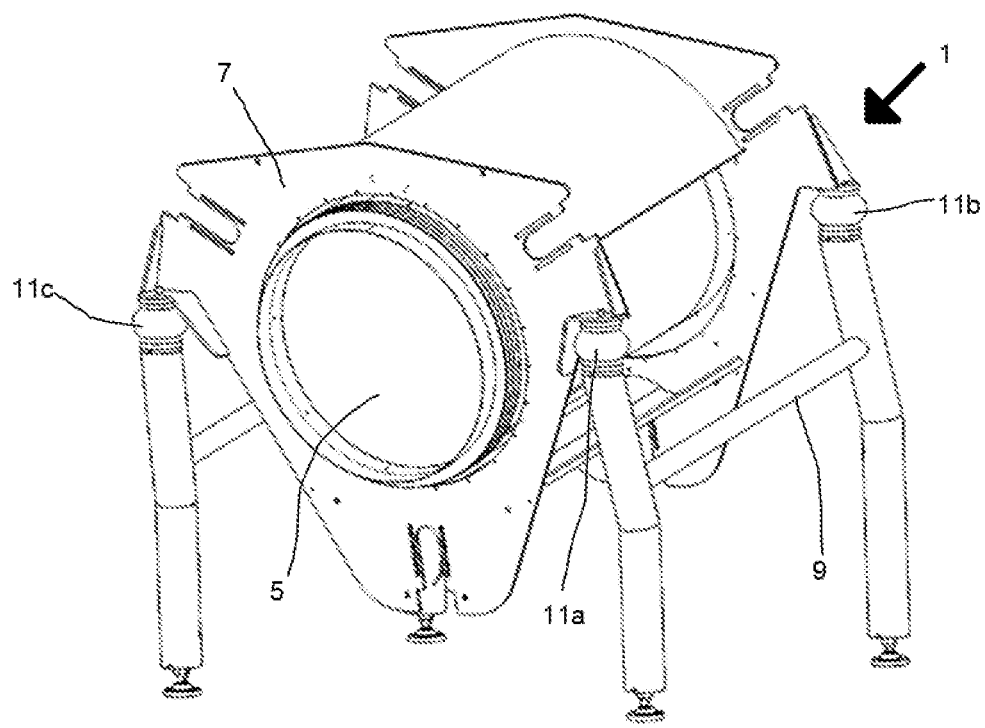
FIGS. 1a, b show a perspective view of an embodiment of the centrifugal device as well as the control system of this centrifugal device.
Figure 1B:
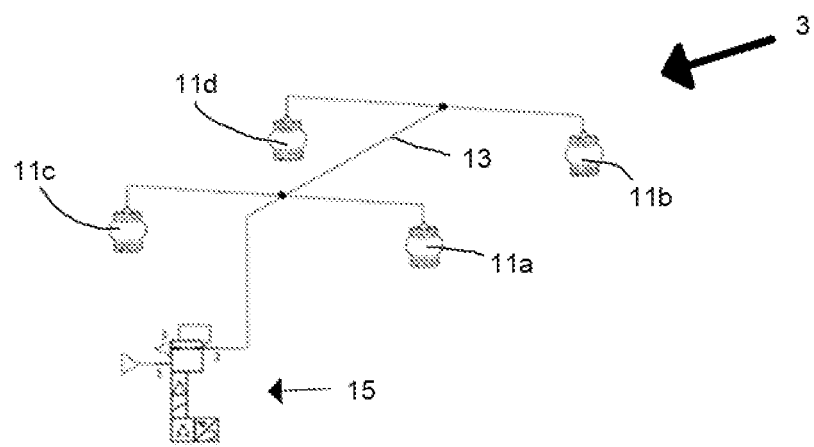

In the figures, identical parts are denoted by the same reference numerals.

There are many embodiments of centrifuges. Centrifuges can roughly be split between continuous and batch machines. In operation, the first type rotates at a constant speed with the product, generally a liquid suspension, continuously passing the drum. With a batch machine, the drum accelerates, for example, from zero rpm (revolutions per minute) to the desired dewatering speed and then brakes again, after the desired centrifuging time, in order to discharge the product. After the drum has been filled with a new batch, the process begins from the start again. Common to all centrifuges is the fact that they have a rotationally symmetrical drum which rotates about an axle or an axis. The drum may be made of perforated sheet metal work, but may also be constructed from adjoining plates. The position of the axis of rotation of the drum may also be very different: horizontal, vertical and any other angle in between.

FIGS. 1a, b show a centrifugal device 1 for a continuous operating mode and a control system 3 for a method for operating/actuating the centrifugal device 1 in operation.

The centrifugal device 1 comprises a drum 5, an intermediate frame 7 and a base frame 9. The base frame comprises four legs positioned on a floor. Vibration-damping elements, i.e. the vibration dampers 11a-11d, are situated between the intermediate frame 7 and the base frame 9. These may be, inter alia, springs, dampers, shock absorber-like means or fluid-filled/air-filled bellows. In FIGS. 1a, b, air-filled bellows 11a-11d are shown. The centrifugal device 1 furthermore comprises a motor (not shown) by means of which the drum 5 can be driven at a variable speed of rotation, that is to say variable revolutions per minute.

Figure 2:
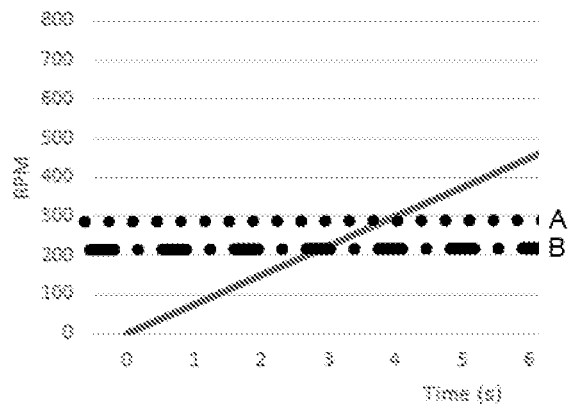
FIG. 2 shows a graph which illustrates the method according to the present invention.

As is shown in FIG. 2, the bellows 11a-d have a certain air pressure, which is calculated specifically for the centrifugal device 1, so that the oscillations are not transmitted, are transmitted in a quiet manner or in any case in a limited manner to the base frame 9 and thus to the floor, for most of the centrifugal process. This optimum or standard air pressure of the bellows 11a-11d is, for example, 5 bar.

The centrifugal device 1 has its own resonance range (speed range) within which the deflection between intermediate frame and base frame is maximal. When accelerating from a relatively low first speed of rotation, the centrifugal device 1 requires a certain amount of time to pass the resonance range. The longer the rotary speed of the centrifugal device 1 is within this resonance range, the larger the deflections which must be compensated for by the vibration-damping elements become. If the weight and/or the imbalance in the drum 5 is relatively substantial, the vibration speed may become so large that the centrifugal cycle has to be interrupted in order to prevent damage to the centrifugal device 1 or the surroundings, resulting in an insufficiently dewatered product, for example crops or wet vegetables, being delivered. The resonance or natural frequency of the centrifugal device 1 is normally lower than the speed range of the centrifugal device 1 in which the centrifugal process, that is to say the separation, is performed. This means that the centrifugal device 1 thus reaches a speed range or passes through different speed ranges during acceleration (increase in rotary speed) or deceleration in which the movement of the drum 5 together with the intermediate frame 7 is relatively significant due to resonance.

In FIG. 2, this has been visualized for the acceleration of the drum 5. The constantly rising line which, at time 0 seconds, is at zero revolutions/rpm and, at time 6 seconds, is at approximately 475 rpm, indicates the speed of rotation of the drum 5. The speed range of the centrifugal device 1 in which the centrifugal process, that is to say the actual centrifugation/separation, is performed, is situated, for example, between 450 and 500 rpm or higher.

The air bellows 11*a-d* have a pressure of 5 bar at a time zero. At this air pressure, the resonance speed range for the centrifugal device 1 is, for example, slightly below 300 rpm, which is indicated by the dashed line and the letter A in FIG. 2. This means that, when increasing the speed of rotation of the drum 5, at a pressure of 5 bar of the air bellows 11*a-d*, the resonance speed range for the centrifugal device 1 is reached at approximately a time of 4 seconds.

By means of the control system 3 which may be provided with a controller 15 and optionally a processor (not shown), the centrifugal device 1 may be actuated in an advantageous manner, so that the resonance range can be passed through as quickly as possible or can even be substantially skipped, by modifying the damping properties of the bellows 11*a-d* via the lines 13 when increasing the speed of rotation of the drum from, for example, 0 rpm to 475 rpm, in such a way that for every bellows 11*a-d*, the mechanical force required for compressing the bellows 11*a-d* is lowered by lowering the pressure in the bellows.

Lowering the air pressure in the bellows by means of the control system 3 is illustrated in FIG. 2 by means of the dash-dotted line indicated by the letter B. By lowering the pressure in the bellows 11*a-d* to the illustrated dashed line B of 4 bar before the time 4 seconds, for example at 3.5 seconds, the resonance speed range is lowered to, for example, 200 rpm as is illustrated in FIG. 2.

Empirically, after theoretical determination, tests have shown and confirmed that the resonance range can be moved to a lower rotary speed by lowering the pressure in the bellows. By lowering the pressure in the bellows during acceleration of the drum, when it has reached the resonance range or just before, the machine will pass the resonance range in a significantly shorter time than when the pressure in the bellows 11*a-d* is kept constant. Since this reduces the time during which the machine stays in the resonance range, the risk of the system swinging to reach an unacceptable deflection between intermediate frame 7 and base frame 9 is reduced or even eliminated. As a result thereof, a centrifugal device 1 may be provided which will visibly and audibly move less during acceleration and will provide more stability.

With the method, preferably at least one operating parameter of the centrifugal device 1 is selected, wherein the above-described decrease in pressure in the bellows 11*a-d* is started when a predetermined value of this/these operating parameter(s) is reached. The operating parameter may be, for example, the exceedance of a vibration deflection of the drum 5 to be predetermined and/or of the intermediate frame 7, which vibration/oscillation is measured by means a vibration deflection sensor (not shown). The operating parameter may also be a rotary speed to be predetermined, which is measured using a revolution counter or the passing of a predetermined time period after the start of the acceleration of the drum 5, which is measured using a timer. The meter/sensor for detecting the operating parameter and its value is connected to the control system 13.

In the example illustrated in FIG. 2, the pressure reduction in the bellows 11*a-d* roughly takes place between the times of 3 and 4 seconds. When accelerating the speed of rotation of the drum 5, the value of the pressure reduction, for example 1 bar, as illustrated in FIG. 2, determines the minimum time at which the damping properties of the vibration dampers have to be modified, while the prevailing pressure in the bellows 11*a-d* determines the maximum time.

Figure 3:
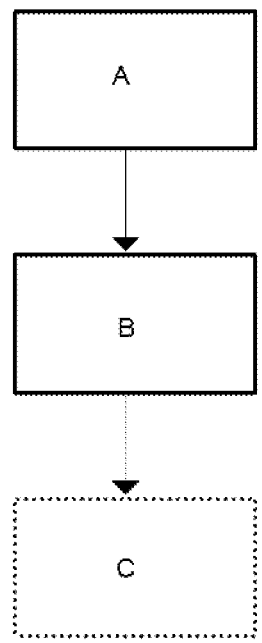
FIG. 3 shows a block diagram which illustrates the method steps according to the present invention.

FIG. 3 diagrammatically illustrates the method for actuating the centrifugal device 1, the method comprising the following steps:

Block A—increasing the speed of rotation of the drum,
Block B—modifying the damping properties of the vibration dampers during the increase in the speed of rotation of the drum in such a way that for each vibration damper the mechanical force which is required for compressing the vibration damper is reduced.

The following, if desired optional, step is also illustrated by a dashed line in FIG. 3: C—modifying the damping properties of the vibration dampers, in such a way that for each vibration damper the mechanical force which is required to compress the vibration damper is increased.

During the increase in the speed of rotation of the drum 5, it is possible to perform step C, for example in the example from FIG. 2 at for example 5 seconds, immediately after passing through the resonance speed range if this offers advantages for the centrifugal process to be performed, for example a quiet centrifugal process at relatively high rotary speeds, or if this is desired or stipulated due to design-related considerations. Step C may also be applied when decelerating the drum 5. This may offer the same advantages as the step B illustrated by block B during acceleration of the drum 5. When decelerating to, for example, 0 rpm, the resonance range will have to be passed through again. For example, if the centrifugal device 1 is ready after having performed a centrifugal process at 475 rpm, it may be advantageous to modify the damping properties according to step C at a certain moment during the deceleration of the drum, so that the pressure in the bellows 11*a-d* is increased from 4 bar (line B in FIG. 2) to 5 bar (line A in FIG. 2), for example, at the rotary speed of 250 rpm. As a result of performing this step at that rotary speed, the resonance range is shortened in the same way as that described above during acceleration. Obviously, it is again possible here to use the operating parameters described herein for determining the initiation of step C. During the reduction of the speed of rotation of the drum 5, the value of pressure increase, for example 1 bar, determines the minimum time at which the damping properties of the vibration dampers have to be modified, while the pressure prevailing in the bellows 11*a-d* determines the maximum time in order to avoid the resonance range as much as possible.

In FIG. 3, this step C is illustrated by a dashed line in order to indicate that this step is optional. After all, the product in the drum 5 is normally less heavy/lighter after a centrifugal process, for example as a result of having been dewatered, as a result of which the risk of severe oscillations is smaller. However, even during deceleration, step C may be desirable in order to reduce the vibrations and oscillations, for example in order to reduce the noise.

A possible process which may be executed by the method for operating the centrifugal device is as follows: In step B (FIG. 3), the damping properties of the vibration dampers are modified from the original damping properties to the damping properties of step B in order to shorten the resonance range. Subsequently, in step C, the damping properties may be modified from the damping properties in step B to the damping properties in step C, with the damping properties in step C corresponding, for example, to the original damping properties in step A. During deceleration, the damping properties at step C, at a relatively high rotary speed, are brought to the damping properties of step B, wherein, depending on an operating parameter during the further deceleration of the drum 5, the damping properties are brought from step B to step C in order to shorten the resonance range. Thereafter, the centrifugal device 1 may, for example, be switched off or be used for a next cycle.

The centrifugal device 1 may furthermore be provided with a number of weighing sensors (not shown) in order to determine a mass and/or distribution of a product to be centrifuged.

It is also possible to select a different modifiable vibration damper, such as a pneumatic damper with or without a spring, a hydraulic damper with or without a spring, or a spring, for example a magnetic spring, instead of bellows 11a-d. In addition, different types of vibration dampers may be combined with one another in a centrifugal device (not shown).

Although a continuous centrifugal device 1 is illustrated and described in detail here, the claimed method may also be used very advantageously with a batch centrifugal device 1. With a batch centrifugal device, an acceleration and deceleration of the drum 5 will occur even more frequently, namely with each batch, as is illustrated in FIG. 2.

The centrifugal device may also be provided with a drum which is attached in an intermediate frame, wherein the intermediate frame is only connected to the base frame by two vibration dampers.

The invention claimed is:

1. A method for operating a centrifugal device comprising a drum which can be driven at a variable speed of rotation, a support frame, and an intermediate frame which is connected to the support frame by at least two vibration dampers, wherein the method comprises the following steps:
   A- increasing the speed of rotation of the drum; and
   B- modifying damping properties of the vibration dampers during an increase in the speed of rotation of the drum in such a way that for each vibration damper to reduce mechanical force compressing the vibration dampers.

2. The method according to claim 1, wherein an operating parameter of the centrifugal device is selected and that step B is started when a predetermined value of the operating parameter is reached during step A.

3. The method according to claim 2, wherein the operating parameters include at least one of:
   exceedance of a vibration deflection of the drum to be predetermined;
   a rotary speed to be predetermined; or
   elapsing of a predetermined time period after the start of step A.

4. The method according to claim 1, wherein the method, after step B, is provided with the following step:
   C- modifying at least one damping property of the vibration dampers, in such a way that, for each vibration damper, the mechanical force compressing the vibration damper is increased.

5. The method according to claim 1, wherein the centrifugal device further comprises a controller for actively controlling the at least one damping property of the vibration dampers.

6. The method according to claim 1, wherein at least one of the vibration dampers comprises a pressurized fluid, and wherein a pressure in at least one of the vibration damper is lowered in step B.

7. The method according to claim 1, wherein at least one of the vibration dampers is a spring.

8. The method according to claim 1, further comprising:
   centrifuging washed vegetables, wherein the washed vegetables are centrifuged in a batch-wise manner or in a continuous manner.

9. A centrifugal device comprising:
   a support frame;
   a rotatably drivable drum including an intermediate frame which is connected to the support frame by at least two vibration dampers;
   a support frame;
   and
   a controller which is configured to:
      increase a speed of rotation of the drum, and
      modify damping properties of the vibration dampers during the increase in the speed of rotation of the drum in such a way that for each vibration damper, mechanical force compressing the vibration damper is reduced.

10. The centrifugal device according to claim 9, wherein the centrifugal device is provided with at least one sensor selected from the group consisting of a vibration deflection sensor of the drum and a weighing sensor to determine at least one of a mass or distribution of a product being centrifuged.

11. The centrifugal device according to claim 9, wherein the vibration dampers are selected from the group consisting of:
   a fluid-filled bellows;
   a pneumatic damper with or without a spring;
   a hydraulic damper with or without a spring; and
   a spring.

12. The centrifugal device according to claim 11, wherein the spring is a magnetic spring.

13. The centrifugal device according to claim 9, wherein the controller comprises a processor.

14. A computer for controlling a centrifugal device having a drum which can be driven at a variable speed of rotation, a support frame, and an intermediate frame which is connected to the support frame by at least two vibration dampers, the computer, comprising:
   at least one processor; and
   a readable storage medium provided with instructions which, when executed on at least one processor, ensure that the at least one processor causes the centrifugal devices to:
      increase the speed of rotation of the drum; and
      modify damping properties of the vibration dampers during the increase in the speed of rotation of the drum in such a way that for each vibration damper, mechanical force compressing the vibration damper is reduced.

* * * * *